UNITED STATES PATENT OFFICE.

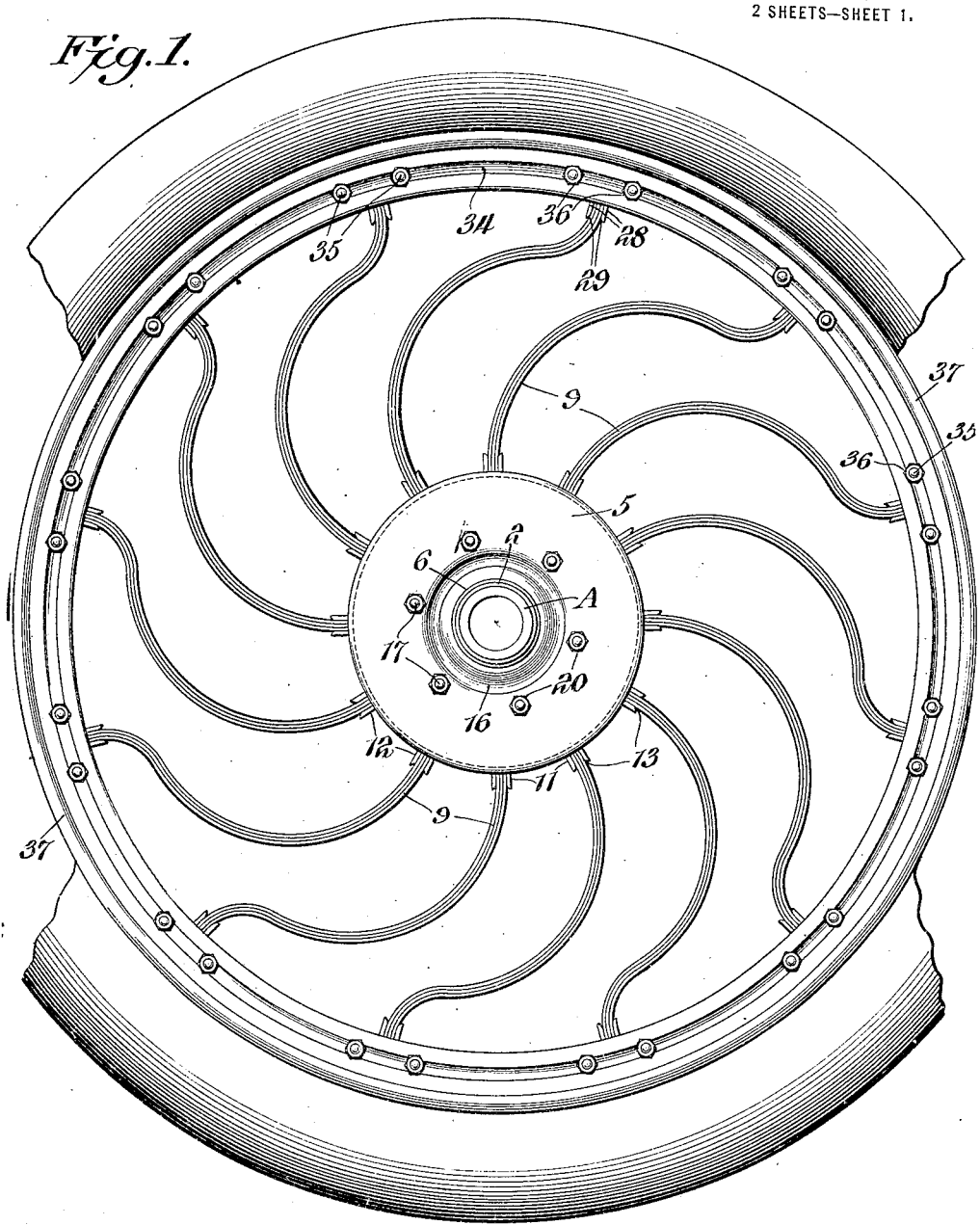

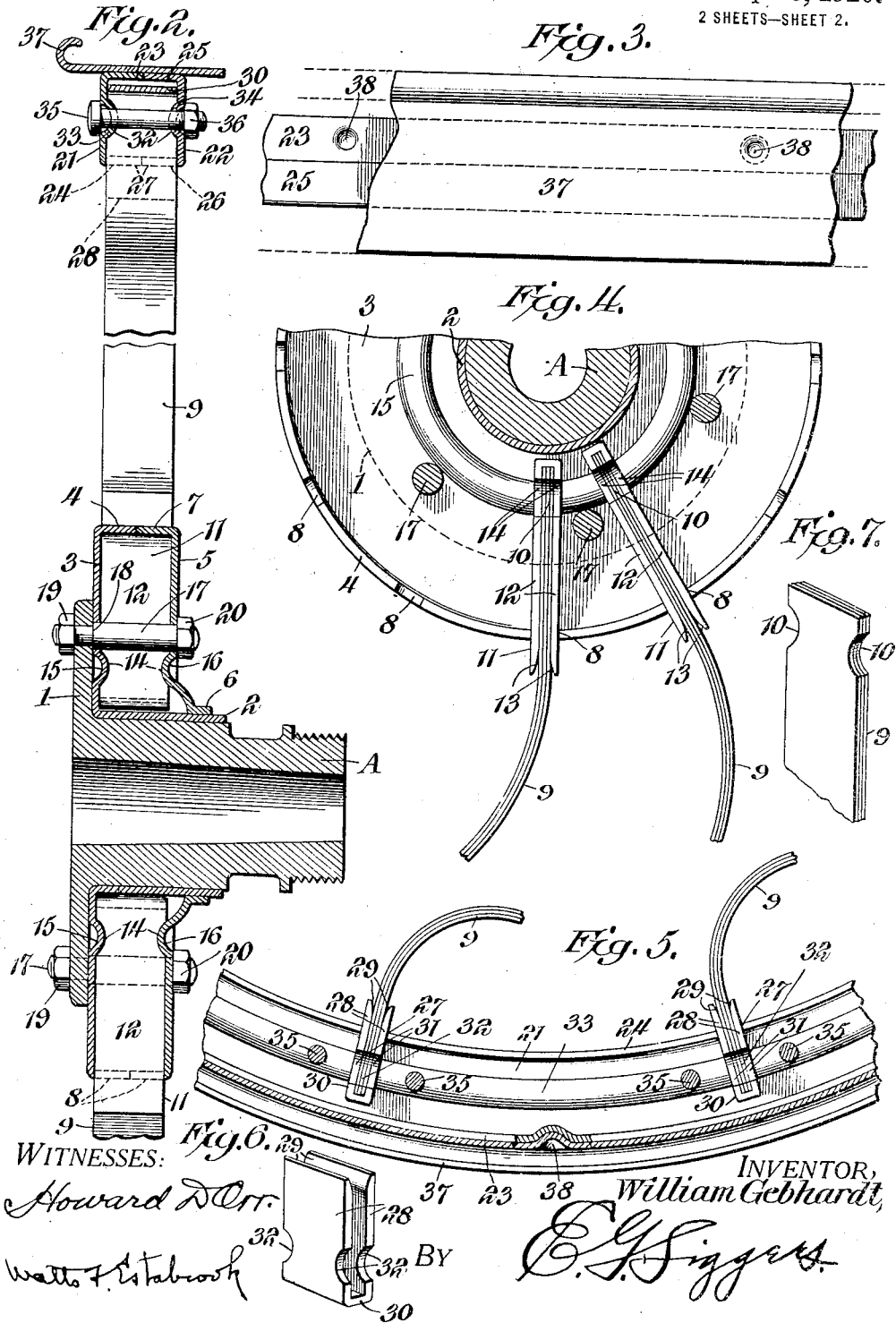

WILLIAM GEBHARDT, OF SAN ANTONIO, TEXAS.

SPRING-WHEEL.

1,336,031.   Specification of Letters Patent.   Patented Apr. 6, 1920.

Application filed July 12, 1915. Serial No. 39,434.

*To all whom it may concern:*

Be it known that I, WILLIAM GEBHARDT, citizen of the United States, residing at San Antonio, in the county of Bexar and State of Texas, have invented a new and useful Spring-Wheel, of which the following is a specification.

This invention relates to an improvement in spring wheels, and the object is to provide resilient spokes which are connected to the hub and felly of the wheel in a manner to take up vibration and shocks imparted to the wheel in traveling or passing over obstructions and rough roads.

A further object is in the provision of means for fastening the spokes to the hub and felly in such a manner that the spokes will be securely held and easily removed.

A still further object is in the provision of a sectional felly and hub which can be assembled and disconnected readily.

The invention consists of certain novel features of construction and combinations of parts, which will be hereinafter described and pointed out in the claims. It will be evident that many slight changes may be made in the form and arrangement of the several parts to be described, and hence I do not wish to be limited to the exact construction herein set forth.

In the accompanying drawings,—

Figure 1 is a view in elevation of a wheel showing my invention with a portion of the tire broken away.

Fig. 2 is a diametric sectional view lengthwise of the axis of the wheel.

Fig. 3 is a plan view of a fragment of the rim and felly.

Fig. 4 is an enlarged detail diametric sectional view through the hub, showing the spokes and clips in elevation.

Fig. 5 is a detail diametric sectional view lengthwise of the felly, showing spokes and clips in elevation.

Fig. 6 is a perspective view of a clip or protector.

Fig. 7 is a perspective view of one of the terminals of a spoke.

In the drawings there is shown an automobile wheel hub A with a radial end flange 1, the construction being that used in the Ford automobile, but it is to be understood that the invention is applicable to many types of automobile or other vehicle hubs.

Mounted on and fitted to the hub A is an annular sleeve 2 extending from the flange 1 toward the other end of the hub and formed at the end toward the flange into a radial annular plate 3 engaging against and of greater radial extent than the flange 1. The plate 3 is formed at its outer edge into a flange 4 substantially concentric with the sleeve 2, but of less length. Mounted on the sleeve 2 is an annular plate 5 substantially parallel with the plate 3 and formed at its inner edge with an annular flange 6 concentric with and fitting the sleeve 2. The outer edge of the plate 5 is formed with a flange 7 directed toward the flange 4 and concentric with the flange 6.

The two plates 3 and 5 constitute face plates, the plate 5 being slidable on and along the sleeve 2, said plates abutting or approximately abutting at the free edges of the respective flanges 4 and 7, which flanges are each provided with a series of notches or recesses 8, the recesses of the two flanges matching and being equi-distantly disposed about the respective flanges.

Mounted between the face plates 3 and 5 are spokes 9 each made up of a plurality of leaves of cold rolled, untempered, silver steel, or of any other suitable material for the purpose, so that the spokes are resilient or spring spokes, and are reversely but progressively curved lengthwise with the end substantially perpendicular to two concentric circles, and spaced apart circumferentially to an extent due to the curvature, whereby they may readily give under conditions of running.

While each spoke may be made of a single strip or sheet, say, of about No. 12 gage in the case of an ordinary automobile wheel, it is sometimes preferable to construct each spoke of several leaves each extending throughout the length of the spoke and placed in face to face relation, so that the spokes may be described as laminated. In such case the gage of each leaf may be less than where one leaf only is used, and in an ordinary wheel, say, such as is employed in a Ford automobile, the gage of the sheets may be of about No. 18.

Each spoke has a hub end and a rim end. Close to the hub end of each spoke are entering notches or recesses 10 and applied to the hub end of each spoke is a clip or pocket member 11 of preferably U shape, having legs 12 closely embracing the corresponding faces of the spokes with the inner faces of the clips or pockets at the outer ends beveled or rounded outwardly, so as to there recede from the corresponding faces of the spoke. Near the yoke end each clip or pocket is notched or recessed, as shown at 14, to register with the notches 10 in the spokes. The notches 8 are of such size as to snugly receive the corresponding portions of the clips or pockets 11, while the plates 3 and 5 are provided with annular inset beads 15 and 16, respectively, in position to enter the notches 11 and 14, whereby both the pockets and spokes are firmly locked to the hub of the wheel when the plates 3 and 5 are in proper position.

The flange 1 carries a circular series of bolts 17 each of which is shouldered at one end, as indicated at 18, and reduced in length where passing through the flange, to which latter it is attached by a nut 19. The plates 3 and 5 are suitably perforated for the passage of the bolts 17 which at the ends remote from the nuts 19 receive other nuts 20, thus clamping the two plates 3 and 5 upon the pockets 11 and together, as well as fastening the two plates 3 and 5 fast to the flange 1, and, therefore, to the hub A. The plate 5, or both plates 3 and 5, may be removed from the hub at any time by first removing the nuts 20. If it be desired to have access to any of the spokes 9 for removal, repairs or the like, the plate 5 may be taken from the hub leaving the spokes and the plate 3 upon the hub, whereupon any one or more of the spokes may be readily removed without disturbing the others, and if need be new spokes may replace broken spokes, after which the plate 5 is returned and the nuts 20 are applied, restoring the wheel to its complete condition.

The felly of the wheel is composed of two annular plates 21 and 22, the plate 21 having edge flanges 23 and 24 and the plate 22 having edge flanges 25 and 26, the flanges of each plate being concentric with the axis of the wheel and with each other and of a length to be in substantial abutment when the outer ends of the spokes 9 are entered between the plates 21 and 22. The flanges 24 and 26 have matching recesses 27 to permit the entry of clips or pockets 28 similar to the pockets 11, but of less length radially of the wheel than the pockets 11, because the felly portion of the wheel is of less radial extent than the hub portion where engaging the spokes 9. The side members of the pockets 28 have their outer ends beveled or rounded where facing the spokes and are provided with closed ends 30 joining the side members or legs of the clips or pockets.

The legs of the clips or pockets 28 are recessed on opposite edges near the yoke 30, as indicated at 31, and the spokes 9 are similarly recessed, as indicated at 32, these recesses matching, while the plates 21 and 22 have circumferential inwardly directed beads 33, 34, respectively, entering the recesses 31 and 32, to thereby hold the plates and spokes together. At suitable intervals, and particularly on opposite sides of and in close relation to the pockets 28, the two plates 21 and 22 are traversed and joined by bolts 35 each having a head engaging one plate, say, the plate 21, and a nut 36 engaging the other plate 22.

Mounted on the flanges 23 and 25 is a rim 37 held against displacement by matching indentations 38 in the rim and one of the flanges, say, the flange 23. The plate 22 may be removed at any time by first removing the nuts 36, since the removal of the plate 22 is not interfered with because no indentations 38 join the rim 37 to the flange 25 of the plate 22. On the removal of the plate 22 the corresponding ends of the spokes 9 with the pockets or clips 28 individual thereto may be removed at the same time the same spokes are removed from the hub portion of the wheel.

It is quite possible to assemble a wheel with the exception of the hub because the face or cheek plates 3 and 5 may be temporarily secured together by bolts extending through the same holes as are provided for the bolts 17, and then if it is desired to apply such an assembled structure to the flange 1, this may be readily accomplished without disturbing the assemblage of the parts carried by the cheek plates 3 and 5. Moreover, any number of damaged spokes may be readily removed from the wheel by simply removing the cheek plate 5 and the felly plate 22.

By providing the hub and rim ends of the spokes with pockets or clips individual thereto, not only are the lamina of the spokes held tightly together against displacement, but they are fully protected against wear or damage where lodged in either the hub or rim portion of the wheel, and such bending of the spokes as may be brought about by the giving of the spokes under running conditions occurs without damage to the spokes because of the outwardly beveled or rounded ends of the legs or sides of the pockets or clips. Furthermore, these rounded edges assure long bends in the spokes rather than sharp bends and consequent freedom from wear or breakage, the latter being especially liable to occur when the spokes are sharply bent with the bendings occurring repeatedly.

The pockets or clips are shown as arranged radially with respect to the axis of the wheel with those portions of the spokes confined in the respective clips also radial of the wheel axis, while the intermediate portions of the spokes between the clips are reversely curved, so that a spoke entering the hub at a certain point enters the rim portion of the wheel at a point considerably displaced circumferentially of the wheel from the hub end of the spoke. This provides for great flexibility of the spokes with sufficient rigidity to sustain the weight imposed upon the wheel while still permitting sufficient yielding of the spokes to absorb shocks and jars to which the wheel may be submitted under running conditions.

The edge portions of the spokes may engage directly against the face or cheek plates 3 and 5 and the rim plates 21 and 22, and the spokes being of considerable width compared with their thickness, are particularly rigid against any forces tending to dish the wheel, without causing injury of the spokes where engaging the hub and rim portions of the wheel.

It has already been stated that the spokes may be made up of a plurality of lamina of silver steel, and it may now be stated that the cheek plates 3 and 5 and the rim plates 21 and 22 may be constructed of vanadium sheet steel which may be readily stamped into form. Such a construction produces a particularly light and strong wheel which may be quickly assembled or disassambled in whole or in part for removal of broken or defective parts and substitution of perfect parts.

While certain gages of metal will answer for certain sizes of vehicle wheels, the gage of metal employed and the number of laminations in the spoke, as well as the width of the spokes, will depend upon the work for which the wheel is designed.

What is claimed is:—

1. In a resilient wheel, a spoke formed of a series of separate spring leaves in face to face contact and each of a length substantially that of the spoke, and a U-shaped clip individual to the spoke and applied to the end thereof and holding all of the leaves together between the legs of the U-shaped clip.

2. In a resilient wheel, a laminiform spring spoke provided with a terminal U-shaped clip individual to and embracing the end of the spoke and coextensive in width with said spoke, both the clip and spoke having matching notches on opposite sides.

3. A resilient wheel provided with laminiform spring spokes having the laminæ of each spoke of equal length and width, U-shaped clips at the ends of the spokes individual thereto and forming holding means for there preventing separation of the laminæ of the spokes, circular plates each with a circumferential series of notches for receiving the clips, said plates constituting the sole holding means for the clips and corresponding ends of the spokes, and fastening means for connecting the plates for holding the spokes within the plates.

4. A resilient wheel provided with laminiform spring spokes having the laminæ of each spoke of equal length and width, U-shaped clips at the ends of the spokes individual thereto and forming holding means for there preventing separation of the laminæ of the spokes, and circular plates each with a circumferential series of notches for receiving the clips, said plates constituting the sole holding means for the clips and corresponding ends of the spokes, and said plates having inwardly directed circumferential beads, and the end portions of the spokes together with the clips embracing them having opposite matching side notches in position to be entered by the beads, and fastening means for connecting the plates for holding the spokes within the plates.

5. A resilient wheel comprising laminiform spring spokes provided with terminal clips embracing and individual to the respective spokes and of substantially the same width as the spoke, each clip and the respective spoke having matching notches or recesses in opposite edges, and circumferentially beaded plates having flanged portions presented toward each other and there provided with matching notches to receive the clips embracing the corresponding ends of the spokes, said beaded portions of the plates entering the notches in the clips and constituting the sole holding means for retaining the spokes in the wheel, and fastening means for connecting the plates for holding the spokes within the plates.

6. A vehicle wheel provided with laminiform spring spokes each with a clip individual and in embracing relation to an end portion of a spoke and having corresponding portions of the edges of the spoke and of the clip provided with notches or recesses, and cheek plates with meeting edge flanges presented one toward the other to separate the plates and correspondingly notched or recessed to receive the clips, and said plates having circumferential beads for entering the matching notches in the edge portions of the spokes and clips, and fastening means connecting said plates for holding the spokes within the plates.

7. A vehicle wheel having a hub portion, a sleeve mounted on the hub portion and provided at one end with a cheek plate terminating in a peripheral flange concentric with the sleeve, another cheek plate fitted to slide lengthwise on the sleeve and having a peripheral flange matching that of the first-named cheek plate, the flanges spacing the cheek plates apart and each provided with a series of notches matching those of the other flange, means for securing the cheek plates on the hub with the flanges presented toward each other, said cheek plates having corresponding circumferential beads, and a circular series of laminiform spokes entering through the matching notches into the space defined by the cheek plates, the entering ends of the laminiform spokes being provided with clips for holding the laminæ in close face to face contact, and the side edges of the laminæ and clips having matching notches for receiving the beads.

8. A vehicle wheel comprising a hub with an end flange radially outstanding therefrom, opposed face plates mounted on the hub with one face plate movable toward and from the other and both face plates having marginal inturned flanges with spaced notches therein and also provided with facing beads, bolts traversing the face plates and hub flange for securing the parts together, and laminiform spring spokes each with a clip individual and in embracing relation to the end portion of the spoke, the side edges of the clip and spoke having matching notches entered by the beads on the face plates and the notches in the flanges of the face plates being of a size to receive the spokes with the clips embracing them.

In testimony that I claim the foregoing as my own I have hereto affixed my signature in the presence of two witnesses.

WILLIAM GEBHARDT.

Witnesses:
  J. G. GEYER,
  ALFRED PFAENDLER.